Patented Oct. 28, 1952

2,615,830

UNITED STATES PATENT OFFICE 2,615,830

PRODUCTION OF PENICILLIN

Richard J. Hickey, Terre Haute, Ind., assignor to Commercial Solvents Corporation, Terre Haute, Ind., a corporation of Maryland No Drawing. Application January 6, 1950, Serial No. 137,269

2 Claims. (Cl. 195—36)

The present invention relates to a process for the preparation of penicillin. More particularly it relates to a process for producing high yields of penicillin by the propagation of the organism *Penicillium chrysogenum* in a nutrient medium containing oleic acid or non-toxic metal salts of oleic acids and phenylacetamide as more particularly described hereinafter.

It is well known that the organism *Penicillium chrysogenum* will synthesize penicillin when propagated in the presence of oxygen on various nutrient media, and that the introduction of certain factors into media will stimulate penicillin production. The fact that oleic acid and certain derivatives of this acid affect the growth of certain bacteria, by stimulation under some circumstances and by suppression of growth under others, is well known. For example, Dubos and Davis (J. Exptl. Med. 83, 409–23 (1946)) observed that some water-soluble esters of oleic acid exert a favorable effect upon the growth of the tubercle bacilli. The effect of oleates upon the growth and metabolic activity of fungi is less known. At any rate, there seems to be no means of predicting the nutritional requirements of any organism.

I have now discovered that oleic acid and certain non-toxic metal salts of that acid promote the formation of penicillin by *Penicillium chrysogenum* in the presence of phenylacetamide. By the term non-toxic oleates is meant any metal salt of oleic acid which is not toxic to the penicillin-producing organism under the conditions employed in producing penicillin by fermentation. Examples of non-toxic metal oleates are the sodium, potassium, lithium, calcium and magnesium oleates. The increases in penicillin yields due to the presence of oleates in the media have been found to be most effective when the oleic acid or metal oleate is added to the basal medium throughout the range of about 0.002 to 0.4% based on the weight of the culture medium. Best results are obtained, however, when about 0.04% by weight of the oleic acid or non-toxic metal oleate is added. The phenylacetamide must be present in the range of about 0.002 to 0.8%, and preferably about 0.06% by weight.

Any of the various procedures employed in conventional penicillin fermentations can be employed when using my new medium. This includes the conventional aseptic techniques, temperatures, rates of air flow through the media and compositions of the media, as well as the fermentation equipment. My method is effective in increasing penicillin production in media of widely varying types, both natural and synthetic, provided phenylacetamide is also present.

My invention can be explained in more detail by reference to the following specific examples which set out the practical operating embodiments of my process of using oleic acid or oleates and phenylacetamide in the media.

EXAMPLE I

In this example a series of comparative runs was made to determine the effect upon penicillin production of varying concentrations of sodium oleate in a synthetic medium. The basal medium used in each of these tests contained the following ingredients, in water:

| | Percent by weight |
|---|---|
| Lactose | 2.25 |
| Glucose | 0.75 |
| $NH_4NO_3$ | 0.50 |
| Glacial acetic acid | 0.25 |
| $KH_2PO_4$ | 0.20 |
| $MgSO_4.7H_2O$ | 0.05 |
| $FeSO_4.7H_2O$ | 0.02 |
| $ZnSO_4.7H_2O$ | 0.002 |
| $CuSO_4.5H_2O$ | 0.0005 |

The pH of the solution was adjusted with potassium hydroxide to 5.9. One hundred and fifty ml. of this basal medium was placed in each of a series of one-liter Erlenmeyer flasks. The basal medium in some of the flasks was supplemented by the addition of 0.06% by weight of penylacetamide and varying quantities of sodium oleate as shown in the table below. Each medium was then sterilized and inoculated with an active culture of *Penicillium chrysogenum* and incubated for five days at 24° C., on reciprocal shakers to provide aeration. The results given in Table I below, show that an increase in penicillin production of 113% over that obtained using a basal medium without phenylacetamide or sodium oleate, can be obtained when .06% phenylacetamide and .04% sodium oleate are added. Also, an increase in yield of 50% is shown over that obtained with the basal medium plus .06% phenylacetamide—an increase of 150% in yield is shown over the basal medium plus .06% sodium oleate alone.

Table I

| Additions to Basal Medium | | 3 days | | 4 days | | 5 days | |
|---|---|---|---|---|---|---|---|
| Na Oleate, Percent by wt. | Phenylacet-amide, Percent by wt. | pH | Penicillin, u./ml. | pH | Penicillin, u./ml. | pH | Penicillin, u./ml. |
| --- | --- | 6.7 | 45 | 6.8 | 89 | 6.8 | 105 |
| 0.06 | --- | 6.8 | 55 | 6.9 | 76 | 7.0 | 89 |
| --- | 0.06 | 6.7 | 50 | 6.9 | 95 | 7.0 | 150 |
| 0.002 | 0.06 | 6.7 | 50 | 7.0 | 112 | 7.0 | 150 |
| 0.005 | 0.06 | 7.0 | 62 | 7.1 | 119 | 7.1 | 177 |
| 0.01 | 0.06 | 7.0 | 79 | 7.0 | 132 | 6.9 | 198 |
| 0.02 | 0.06 | 7.1 | 84 | 7.0 | 144 | 6.8 | 200 |
| 0.04 | 0.06 | 7.0 | 89 | 7.0 | 140 | 6.9 | 224 |
| 0.06 | 0.06 | 6.9 | 91 | 7.0 | 149 | 6.8 | 188 |
| 0.1 | 0.06 | 7.0 | 100 | 7.0 | 144 | 6.8 | 186 |
| 0.15 | 0.06 | 6.8 | 103 | 6.9 | 153 | 6.8 | 194 |

EXAMPLE II

A series of media was prepared, each medium consisting of:

360 gallons corn steep liquor
1500 pounds lactose
80 pounds phenylacetamide
25 gallons corn oil
11 gallons oleic acid
11 gallons mineral oil
Water to 10,000 gallons The pH of each medium was adjusted to 5.7–5.9 with soda ash. Each medium was then sterilized, cooled to 24° C., and run into 12,000 gallon iron tanks equipped with spargers for supplying sterile air. The medium was then inoculated by adding cultures prepared from spores of *Penicillium chrysogenum*. The fermentation vessels containing the inoculated media thus prepared were maintained at 24° C. and the media aerated for a period of about 90 hours. After completion of the fermentation, the media were filtered to remove solid mold particles and the clear beer passed through a chemical extraction process to recover penicillin. The results of this series of fermentations are shown in Table II below.

Table II

| Fermentation No. | Assay u./ml. | gms. Crude Penicillin |
|---|---|---|
| 838 | 525 | 6,951 |
| 839 | 570 | 6,630 |
| 840 | 525 | 6,000 |
| 841 | 570 | 8,414 |
| 842 | 525 | 6,590 |
| 843 | 435 | 6,717 |
| 844 | 500 | 9,510 |
| 845 | 410 | 5,657 |
| 846 | 510 | 4,939 |
| Ave | 507 | 6,823 |

EXAMPLE III

A series of fermentations was run exactly according to the procedure described in Example II, except that the media employed did not contain any oleic acid. The results of this series of fermentations are shown in Table III. As is evident from a comparison of the results shown in Tables II and III, the addition of oleic acid to fermentation media brings about considerable increases in penicillin yields.

Table III

| Fermentation No. | Assay u./ml. | Gms. Crude Penicillin |
|---|---|---|
| 847 | 323 | 7,415 |
| 848 | 370 | 5,423 |
| 849 | 300 | 5,389 |
| 850 | 128 | 5,498 |
| 851 | 350 | 4,282 |
| 852 | 390 | 5,347 |
| 853 | 504 | 6,257 |
| 854 | 525 | 7,458 |
| 855 | 525 | 6,967 |
| 856 | 290 | 5,559 |
| Ave | 370 | 5,960 |

While I have described what I consider to be the most advantageous modifications of my process, it is evident of course that various modifications can be made in the specific procedures which have been described without departing from the purview of this invention.

I claim:

1. In a process for preparing penicillin by the propagation of the organism *Penicillium chrysogenum* in a nutrient medium, the improvement which comprises propagating said organism under aerobic conditions in a nutrient medium containing from about 0.002 to 0.8% by weight of phenylacetamide and about 0.002 to 0.4% by weight of a member selected from the group consisting of oleic acid and non-toxic metal oleates.

2. In a process for preparing penicillin by the propagation of the organism *Penicillium chrysogenum* in a nutrient medium, the improvement which comprises propagating said organism under aerobic conditions in a nutrient medium containing from about 0.002 to 0.8% by weight of phenylacetamide and from about 0.002 to 0.4% by weight of sodium oleate.

RICHARD J. HICKEY.

REFERENCES CITED

The following references are of record in the file of this patent:

UNITED STATES PATENTS

| Number | Name | Date |
|---|---|---|
| 2,458,495 | Foster | Jan. 11, 1949 |

FOREIGN PATENTS

| Number | Country | Date |
|---|---|---|
| 593,007 | Great Britain | Oct. 6, 1947 |

OTHER REFERENCES

Penicillin Research Progress Report No. 6, May 27, 1944, Departments of Biochemistry etc., University of Wisconsin, W. P. B. Contract 118, page 2.

Ibidum, Report No. 10, August 5, 1944, page 3.

Stefaniak et al.: Journal of Bacteriology, vol. 52, No. 1, July 1946, pages 119, 125 to 127.